April 26, 1949.  A. M. KOHLER  2,468,712
HEAT EXCHANGER
Filed Dec. 21, 1944

INVENTOR
Anthony M. Kohler
BY
ATTORNEY

Patented Apr. 26, 1949

2,468,712

UNITED STATES PATENT OFFICE 2,468,712

HEAT EXCHANGER

Anthony M. Kohler, Spring Lake, N. J., assignor to The Babcock & Wilcox Company, Rockleigh, N. J., a corporation of New Jersey Application December 21, 1944, Serial No. 569,251

8 Claims. (Cl. 257—55)

The present invention relates to feeding devices and more particularly to centrifugal feeders of the table type adapted for handling fluent solid materials.

The general object of the present invention is the provision of a feeder capable of continuously or intermittently delivering a substantially uniform stream of fluent solid materials at predetermined rates of discharge. A further and more specific object is the provision of a table feeder of the centrifugal type which is characterized by its ability to feed generally spherical pieces of material of substantially uniform size at predetermined rates of discharge. A further specific object is to provide a centrifugal feeder of the type described which is particularly adaptable for use in connection with fluid heaters wherein a fluent solid material is discharged to the feeder at an elevated temperature. An additional object is to provide a metallic table feeder having a minimum amount of metallic table surface exposed to abrasion from the flow of fluent solid materials thereacross. A further object is the provision of a feeder that is compact and is simple and inexpensive to manufacture and operate.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of my invention.

Figure 2:
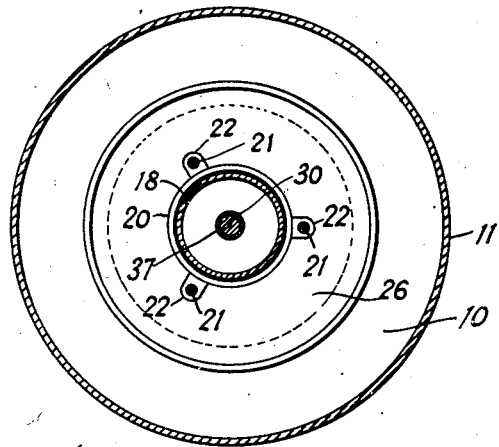
Fig. 2 is a horizontal section taken on the line 2—2 of Fig. 1.
Figure 1:
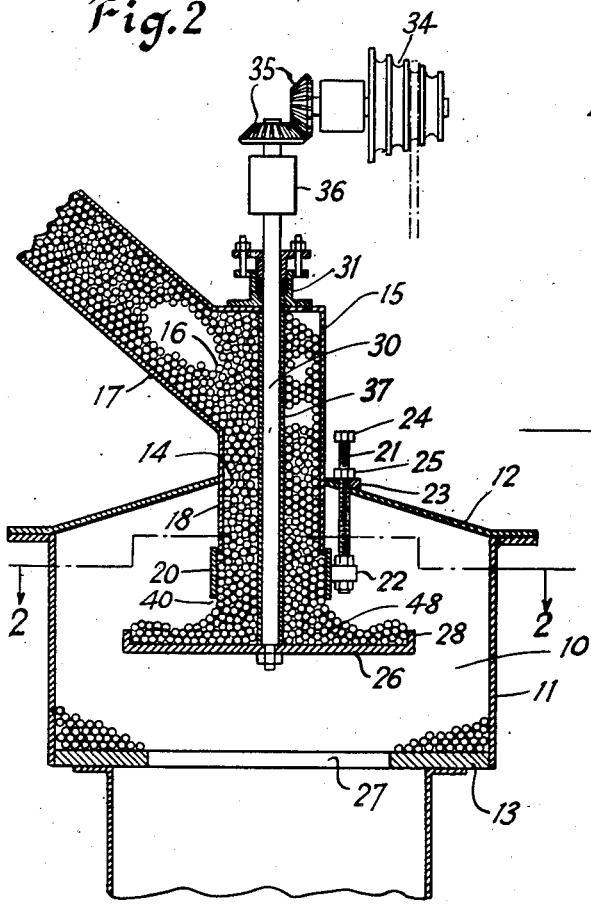
Fig. 1 is a sectional elevation of a centrifugal type feeder constructed in accordance with my invention.

In the embodiment of the invention shown in detail in Figs. 1 and 2, a feeder chamber 10 is enclosed by a cylindrical wall 11 having a frustoconical top 12 and a substantially horizontal bottom plate 13. The top 12 has a central opening 14 in which is mounted a pipe 15 forming an inlet chamber opening to the chamber 10. The chamber 10 and the pipe 15 have a common vertical axis and the upper portion of the pipe 15 is provided with a side inlet 16 through which the material to be handled by the feeder is received from a storage space or the like (not shown) through a discharge pipe 17. An extension 18 of the pipe 15 projects downwardly into chamber 10 to form an open ended cylinder which is coaxial with the wall 11 and ends at a horizontal position slightly below the level of the junction between the conical top 12 and the wall 11. The effective length of the pipe 15 is made variable by the provision of a sleeve 20 slideably supported on the pipe extension 18 by a plurality of circumferentially spaced vertically adjustable rods 21 secured thereto by lugs 22. As shown in Fig. 1, each rod 21 is threaded throughout its length and projects through a threaded boss 23 on the top 12. An adjusting head 24 and a nut 25 is provided on the external portion of each rod, the nut being used to lock the rod in the desired position. A substantially horizontal imperforate disc or table 26 is arranged coaxially of the extension 18 at a position between the lower end of pipe extension 18 and a coaxial discharge outlet 27 in plate 13.

Figure 3:
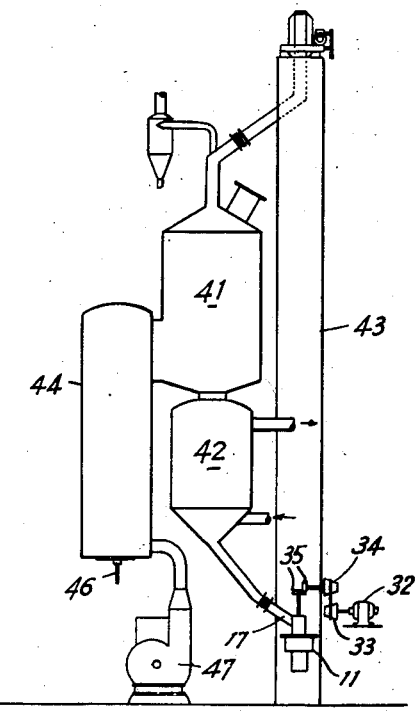
Fig. 3 is a diagrammatic elevation of fluid heating apparatus incorporating a feeder of the present invention.

In the embodiment of the feeder shown, the table 26 is provided with an upwardly projecting circumferential flange 28 which forms a low dam or restriction to the flow of material outwardly across the upper surface of the table. With a circumferential flange on the table 26 as described, a layer of the material being fed will normally remain on the upper surface of the table during operation and provide a surface for the flow of additional material thereacross. This will not only result in an advantageous reduction in wear on the upper surface of the table, but will also provide a frictional surface for the flow of material thereacross, which is desirable in the operation of the feeder as hereinafter described. The table 26 advantageously has a substantially greater diameter than the pipe extension 18 and is carried on the lower end of a vertical shaft 30 which is coaxial with the extension 18 and extends upwardly through the pipe 15 to engage a conventional variable speed drive. The shaft 30 is held in position by vertically spaced bearings 31 and 36 mounted on the top of the pipe 15. One example of a suitable variable speed drive is illustrated in Figs. 1 and 3, wherein a constant speed electric motor 32 is connected to the shaft 30 through a pair of V belt connected cone pulleys 33 and 34, and a bevel gear transmission 35. The shaft 30 is protected against abrasion due to the flow of abrasive material through the feeder by a replaceable sleeve 37.

An annular orifice 40 is thus in effect formed between the upper surface of the table 26 and the lower end of the cylindrical sleeve 20, and it has been found desirable to maintain the vertical spacing therebetween throughout the circumference thereof uniform for each adjusted position of the sleeve 20. Thus, with the table 26 and sleeve 20 coaxial, as previously described, the material passing into the feeder will spread uniformly over the surface of the table 26, and upon rotation of the table, the material will discharge in a substantially evenly distributed stream throughout the circumference of the feeder table 26 at a rate proportionate to the speed of rotation of the table. Since the material is discharged over the full circumference of the table, the feeder will have a relatively high capacity with a small diameter, as compared with the table feeders of the type having a restricted peripheral discharge opening. In addition the even distribution of weight imposed by the material on the table 26 will result in a thrust on the bearing 31 which will be vertically downward, thereby simplifying the construction of and the maintenance on that bearing.

Any fluent solid material that may be handled in feeders of this type will have a characteristic angle of repose, the value of which will be largely dependent upon the size and shape of the material, the specific gravity thereof, and the various friction factors between the material and the surfaces of contact. It is desirable to adjust the position of sleeve 20 so that the characteristic angle of repose of the specific material being handled by the feeder, relative to its supporting surface, will be somewhat greater than the acute angle of a line between the lower edge of sleeve 20 and the effective edge of the table 26, in this case the top of circumferential flange 28, to the horizontal, so that the discharge of material from the sleeve 20 will be stopped when the table 26 is stationary. In other words, a truncated right cone conceived as being drawn to have its outer surface common with the lower periphery of the sleeve 20 and also common with the effective periphery of table 26 will have a base angle not greater than the angle of repose of the material being handled. With the feeder constructed and adjusted as described, the material delivery rate therefrom will be closely proportional to the centrifugal force applied to the material and the feeder may be calibrated as to capacity in accordance with the rotational speed of the table 26.

One of the most difficult solid materials to feed with controllable regularity and without flooding is a solid material having a substantially uniform spherical particle shape and size. As an example of the operation of the feeder of the present invention and the operational characteristics thereof when feeding such a spherical material, a feeder of the type shown in Figs. 1 and 2 has been used in a fluid heating unit of the type illustrated in Fig. 3, which is disclosed and claimed in the copending application of E. G. Bailey and R. M. Hardgrove, Serial No. 599,180, filed on June 13, 1945. In fluid heaters of this type, a fluent column of heat transfer material is heated in an upper chamber 41 by direct contact with a heating fluid and flows by gravity into a lower chamber 42 wherein it is used to heat a second fluid in heat transfer relation therewith. The cooled heat transfer material is advantageously withdrawn from the lower chamber by the feeder described and returned to the upper chamber 41 by an elevator 43, a continuous flow of heat transfer material insuring a uniform outlet temperature for the heated fluid. The heating fluid is generated in an external furnace 44 by the combustion of fuel and air, supplied by a fuel line 46 and a blower 47. In fluid heating apparatus of this character, the feeder must be capable of stopping the flow of heat transfer material therethrough so as to permit storage of that material in the chambers when desired during scheduled shut downs of the equipment and to avoid overloading the elevator during operation of the apparatus. When operating conditions within the lower chamber 42 require a gas seal at its heat transfer material discharge end, the discharge pipe 17 and inlet pipe 15 are made of sufficient length to have the contained column of material provide a substantial gas sealing effect. One type of heat transfer material utilized in the fluid heater described consists of artificial refractory pellets 48 of substantially spherical shape and approximately $\frac{1}{16}$ inch in diameter. Pellets of this character and size have an angle of repose depending upon the friction factors between the pellets and their effective supporting surface. When such pellets are massed on a smooth flat surface, for example, the angle of repose will be approximately 10°, and when such pellets are massed on a smooth flat surface having a peripheral dam, such as with the table and circumferential flange of the feeder described, the angle of repose of such pellets is approximately 32°. The difference between the two angles of repose is largely due to the difference in friction factors between the pellets and a smooth surface in the former case and between the pellets and a substantially stationary supporting layer of pellets in the latter case.

One such feeder used in the fluid heating apparatus described had a table 26 with a diameter of twelve inches and a circumferential flange 28 extending ½ inch above the surface of that table. The feeder was operated with the orifice 40 having a vertical height of 1⅝ inches and delivered pellets therefrom at a rate of from 300 to 22,000 pounds per hour with speeds of from 15 to 90 revolutions per minute. Likewise, with an orifice height of 3⅛ inches, the feed rate was from 3,000 to 22,000 pounds per hour with speeds of from 15 to 60 revolutions per minute. For each specific orifice opening, a capacity curve in pounds of pellets fed per hour is plotted against feeder speed was generally proportional to a square root curve, which is also characteristic of the curve of centrifugal force as plotted against the same feeder speeds. It will be noted that when the height of the orifice is 3⅛ inches, a radial line drawn from the lower end of the sleeve 20 to the top of the flange 28 will be at an acute angle of approximately 34° with respect to the horizontal, which is greater than the 32° angle of repose for the $\frac{1}{16}$ inch diameter pellets. However, the effective height of the restriction to the flow of pellets over the flange 28 will actually be increased by the action of the pellets in passing over the table 26. Since the pellets of this example are $\frac{1}{16}$ of an inch in diameter and the height of the flange 28 is ½ inch, the pellets will tend to form a double layer of pellets across the upper surface of the table, particularly around the inside circumference of the flange, and thus increase the effective height of the flow restriction so as to provide an actual angle of approximately 31°. Furthermore, under these conditions, stopping the feeder table will also stop the flow of material through the feeder. As a practical operational procedure and to introduce a factor of safety against the possibility of material flooding through the feeder, it is desirable to limit the orifice height to a dimension somewhat less than the angle equivalent to the angle of repose of the material handled. This is due to the possible changes in the actual angle of repose of the material being handled. For example, the pellets previously described may be irregular in shape or size, either as caused in their manufacture or as caused by normal wear in passing through the fluid heater apparatus, which will result in a smaller angle of repose.

Preferably the orifice 40 will be maintained at the largest opening permitted by the angle of repose of the material handled so as to avoid any possibility of choking the feeder. However, for reduced capacities of the feeder, it is often desirable to reduce the height of orifice 40 to meet lower feed rate requirements, rather than an excessive reduction in feeder speed with the possibility of reduced accuracy of feed regulation. Obviously, caution must be observed in lowering the sleeve 20 so as to prevent reducing the orifice height to an amount at which the material being fed may jam in the orifice 40 and choke the feeder. The optimum minimum orifice opening will depend upon the physical characteristics of the material being fed and for the pellets previously described, a minimum orifice opening of 1⅝ inches was found to be entirely satisfactory both from the standpoint of freedom from choking and in obtaining an accurate feed regulation at low rates of output capacity.

With materials having a high angle of repose such as cubes or other shapes having flat surfaces, it will not be necessary to provide a circumferential flange to restrict the flow of material across the feeder table 26 of the present invention. Under such conditions of material characteristics, the flange 28 may be removed and the feeder will be operative as previously described, wherein the feed rate will be governed by feeder speed, and/or sleeve 20 adjustment changing the height of the orifice.

When feeding spherical materials such as the described pellets, it is desirable to operate with the flange 28, as in the embodiment of the feeder shown in Figs. 1 and 2, so as to obtain a high angle of repose on the feeder table. With the type of construction described, the surface of the table 26 is advantageously protected by a layer of pellets and is not subjected to wear by reason of the passage of pellets thereacross. In fluid heating systems of the type illustrated in Fig. 3, the possibility of contamination of the heated fluid by the presence of abraded metallic particles resulting from table wear, in the cyclic heat transfer process must be minimized or avoided. This is accomplished with the feeder construction of the present invention.

In operation, the delivery rate of material from the feeder is regulated by a change of feeder speed and/or by vertical adjustment of the position of sleeve 20. When the feeder is used to feed pellets in the fluid heating apparatus shown in Fig. 3, and in many other types of feeder service, the position of the sleeve 20 will normally remain fixed in any specific installation so long as the fluent solid material size and shape remain substantially uniform, and any operational feed rate adjustments will be accomplished by feeder speed regulation.

It will be noted that the centrifugal feeder of the present invention utilizes a combination of friction and centrifugal forces to effect an accurate and simple control of material feed rates. This feeder is particularly applicable to the feeding of spherical pellets which are ordinarily difficult to feed satisfactorily at predetermined rates over a wide range of capacities, due to their tendency to flood through ordinary table type feeders or, to choke the feeder when attempts are made to eliminate flooding by the imposition of restricted orifices. In the present invention, a high angle of repose is created for such pellets with a non-choking restriction which permits the use of comparatively high rotative speeds and a circumferential discharge, resulting in a compact, low cost feeder.

I claim:

1. A feeding device for a rolling solid material with a low angle of repose comprising a casing having a circular inlet opening and an outlet opening therein, a vertical shaft coaxial with said inlet, a horizontally disposed circular table attached to said shaft and spaced below said inlet opening, a circumferential flange on said table uniformly extended above the upper surface of said table, a drive mechanism for rotating said table, and means for changing the vertical spacing between said inlet and said table whereby the base angle of a truncated right cone having a surface common with the periphery of said inlet opening and the effective periphery of said table will be less than the angle of repose of the rolling material to be fed as formed on the upper surface of said table.

2. In combination, a fluid heater having superimposed connected upper and lower chambers enclosing a fluent column of heat transfer material formed of a mass of individual spherical particles of substantially uniform size and shape, means for heating said heat transfer material in said upper chamber, means for heating a fluid in said lower chamber by direct heat transfer contact with said heat transfer material, means for causing said material to move continuously downwardly through said fluid heater at controllable rates including a centrifugal feeder having a feeder casing with a centrally located circular inlet opening in the top thereof, an elongated discharge pipe for said heat transfer material connecting said lower chamber and said inlet opening and providing a substantial seal against flow of fluids therethrough, a horizontally arranged table coaxial with and of greater diameter than said inlet and having a circumferential flange on said table uniformly extended above the surface thereof, a vertical shaft coaxially supporting said table, means for rotating said shaft, a vertically adjustable sleeve forming a continuation of said inlet spaced above said table, an outlet opening in said casing below said table, and an elevator receiving said heat transfer material from said outlet and returning said heat transfer material to said upper chamber.

3. A feeding device comprising a casing having a circular inlet and an outlet for fluent solid materials, a vertical shaft coaxial with said inlet, a horizontally disposed circular table attached to said shaft and spaced below said inlet opening, a drive mechanism for rotatably supporting said table, means for increasing the angle of repose of said fluent solid materials by increasing the flow resistance of said materials across the upper surface of said table, and means for changing the vertical spacing between said inlet and said table whereby the base angle of a truncated right cone having a surface common with the periphery of said inlet opening and the periphery of said table will be less than the angle of repose of the material to be fed as formed on the upper surface of said table.

4. A centrifugal feeder comprising a horizontally disposed circular table rotatable about its vertical axis, means for rotating said table at selected speeds, means for delivering substantially spherical bodies to the central portion of the upper surface of said table, means for maintaining a layer of said bodies on the upper surface of said table at said selected speeds for the passage of other substantially spherical bodies thereacross including a circumferential flange on said table uniformly extended above the surface of said table, and means for preventing the flow of said spherical bodies across said table when the rotation thereof is stopped.

5. A centrifugal feeder comprising a horizontally disposed circular table rotatable about its vertical axis, means for rotating said table at selected speeds, means for delivering substantially spherical bodies of generally uniform size to the central portion of the upper surface of said table, means for maintaining an upper surface of said bodies on said table at said selected speeds for the passage of other substantially spherical bodies thereacross including a circumferential flange on said table uniformly extended above the surface of said table a distance greater than the individual diameter of said spherical bodies, and means for preventing the flow of said other spherical bodies across said table when the rotation thereof is stopped.

6. A feeder apparatus for substantially spherical bodies of generally uniform size comprising a casing having an inlet opening at the top and an outlet opening at the bottom thereof, a vertical shaft coaxially extending through said inlet terminating at a position between said inlet and said outlet, a horizontally disposed circular table concentrically attached to the lower end of said shaft, means for maintaining at least a peripheral substantially stationary layer of said spherical bodies on the upper surface of said table for the movement of additional spherical bodies thereover during feeding, a sleeve within said casing forming a continuation of and surrounding said inlet in which the included angle between a line drawn radially from the lower periphery of said inlet opening to the upper periphery of said substantially stationary layer of spherical bodies on the upper surface of the table and an intersecting horizontal line is less than the angle of repose of said bodies on said table, and means for rotating said table at selected speeds.

7. A feeder apparatus for substantially spherical solid materials of essentially uniform dimensions comprising a casing having an inlet opening at the top and an outlet opening at the bottom thereof, a vertical shaft coaxially extending through said inlet terminating at a position between said inlet and said outlet, a horizontally disposed circular table concentrically attached to said shaft, means for maintaining at least an essentially stationary layer of said spherical solid materials on the upper surface of said table for the movement of other spherical solid materials thereover during feeding, a vertically adjustable sleeve within said casing forming a continuation of and surrounding said inlet in which a radial line drawn from the lower circumference of said sleeve to the upper periphery of said essentially stationary layer of spherical solid material on the upper surface of the table and an intersecting horizontal line is less than the angle of repose of said materials on said stationary spherical solid material on said table, and means for rotating said table at selected speeds to regulate the feed rate of said substantially spherical solid materials.

8. A feeding device comprising a casing having a circular inlet and an outlet for fluent solid materials, a vertical shaft coaxial with said inlet, a horizontally disposed circular table attached to said shaft and spaced below said inlet opening, a drive mechanism for rotatably supporting said table, means for increasing the angle of repose of said fluent solid material by increasing the flow resistance of said materials across the upper surface of said table, the preselected vertical spacing between said inlet and table being such that the base angle of a truncated right cone having a surface common with the periphery of said inlet opening and the periphery of said table will be less than the angle of repose of the material to be fed as formed on the upper surface of said table.

ANTHONY M. KOHLER.

REFERENCES CITED

The following references are of record in the file of this patent:

UNITED STATES PATENTS

| Number | Name | Date |
| --- | --- | --- |
| 278,392 | Brookmire | May 29, 1883 |
| 1,148,331 | Olsson | July 27, 1915 |
| 1,157,935 | Gray | Oct. 26, 1915 |
| 1,178,667 | Niewerth | Apr. 11, 1916 |
| 2,325,665 | Cox | Aug. 3, 1943 |

FOREIGN PATENTS

| Number | Country | Date |
| --- | --- | --- |
| 212,671 | Great Britain | Mar. 20, 1924 |
| 502,095 | Germany | July 8, 1930 |